United States Patent [19]
Barbour et al.

[11] Patent Number: 5,754,386
[45] Date of Patent: May 19, 1998

[54] TRIP DEVICE FOR AN ELECTRIC POWERED TRIP UNIT

[75] Inventors: Erskine Barbour, Benson; Stuart R. Akers, Raleigh, both of N.C.

[73] Assignee: Siemens Energy and Automation, Inc., Alpharetta, Ga.

[21] Appl. No.: 674,642

[22] Filed: Jun. 28, 1996

[51] Int. Cl.$^6$ .................................................. H01H 9/00
[52] U.S. Cl. ........................................................ 361/154
[58] Field of Search .................................. 361/154–156, 361/160, 170

[56] References Cited

U.S. PATENT DOCUMENTS

| | | | |
|---|---|---|---|
| 3,873,847 | 3/1975 | Finch et al. | 307/132 R |
| 3,936,701 | 2/1976 | Wilson et al. | 361/92 |
| 4,183,071 | 1/1980 | Russell | 361/59 |
| 4,331,996 | 5/1982 | Matsko et al. | 361/92 |
| 4,675,776 | 6/1987 | Howell | 361/156 |
| 4,683,529 | 7/1987 | Bucher, II | 363/44 |
| 4,797,541 | 1/1989 | Billings et al. | 235/449 |
| 4,797,779 | 1/1989 | Richards et al. | 361/154 |
| 4,812,945 | 3/1989 | D'Onofrio | 361/154 |
| 5,053,911 | 10/1991 | Kopec et al. | 361/154 |
| 5,138,249 | 8/1992 | Capel | 323/283 |
| 5,191,302 | 3/1993 | Rossnick | 219/10.77 |
| 5,394,291 | 2/1995 | Janke et al. | 361/155 |
| 5,457,622 | 10/1995 | Arakawa | 363/59 |
| 5,489,837 | 2/1996 | Arakawa | 323/207 |
| 5,502,630 | 3/1996 | Rokhvarg | 363/84 |
| 5,539,608 | 7/1996 | Hurley et al. | 361/152 |
| 5,546,268 | 8/1996 | Hurley et al. | 361/154 |

Primary Examiner—Ronald W. Leja

[57] ABSTRACT

An under voltage trip device for low and medium voltage breakers is disclosed. A first power supply receives unregulated power from a control voltage supply which is rectified and regulated with portions of the power supply monitored by a processor. The output of the first power supply is supplied to a second power supply which allows pulsing modulating power to be supplied to a solenoid connected thereto. The current supplied to the solenoid is measured and calculated by the processor and stored therein as well as being compared to stored values, thereby determining solenoid armature position and predicting or warning of solenoid failure. Connected to the second power supply is a third power supply which operates in a voltage regulator supply mode and a switcher mode during start-up and continuous running operation respectively, such mode being controlled by the processor. Switches are connected to the processor so that multiple control voltage sources may be selected and so that the delay time and pick-up or drop-out points with respect to the control voltage may be adjusted in order to determine operation of the solenoid and the position and condition of the solenoid armature and coil. The solenoid is pulsed with higher than rated voltages in order to firmly lock in the solenoid and to delay its decay during an undervoltage condition from the control voltage supply.

9 Claims, 4 Drawing Sheets

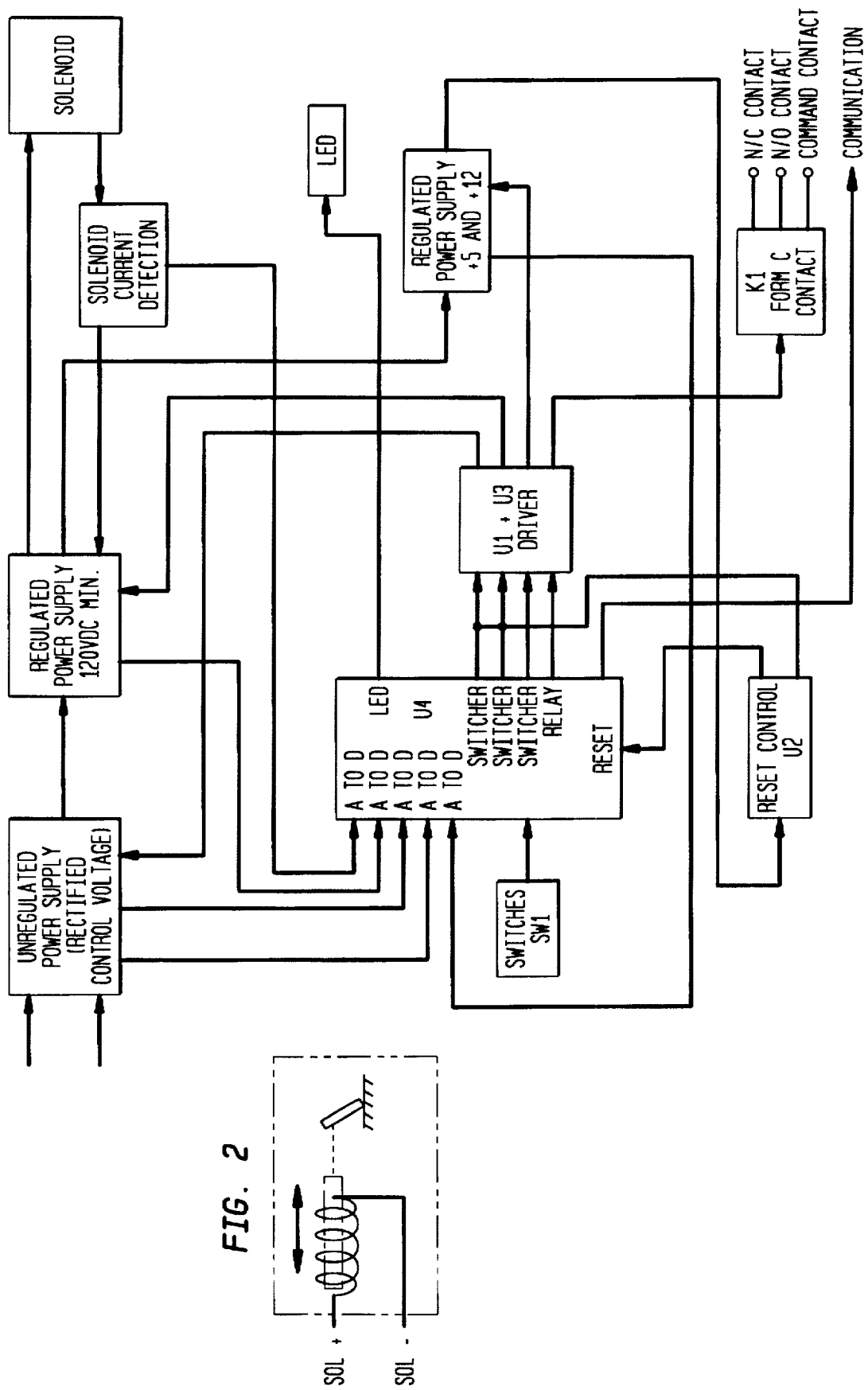

TRIP DEVICE FOR AN ELECTRIC POWERED TRIP UNIT

FIELD OF THE INVENTION

This invention relates, generally, to electric powered trip units, such as circuit breakers and more particularly to an improved trip device which cooperates with an electric powered trip unit.

BACKGROUND OF THE INVENTION

In a typical factory-powered distribution system, power is generated by a power generation company and supplied to a factory and thereafter distributed around the factory to various equipment such as, for example, motors, welding machinery, computers, heaters, lighting, and the like.

Power distribution systems of this type are typically centrally located in switchgear rooms or substations. From there, power is divided up into branches wherein each branch supplies power to a portion of the factory and/or specified loads. Frequently, there are disposed around the factory transformers to step down the supply voltage to that required by specific pieces of equipment or portions of the factory. Therefore, a factory-powered distribution system typically has a number of transformers servicing various types of equipment in various areas. Inherent with this, is the high cost of the power-distribution equipment such as transformers, as well as the cost of the equipment to which power is being supplied. Therefore, it is quite common to provide protective devices such as circuit breakers or fuses in at least each branch so that not only may each piece of equipment be protected but any problems associated with one piece of equipment does not ripple to adjacent or interconnected pieces of equipment. Further, providing fuses or circuit breakers in each branch can help minimize down-time since specific loads may be energized or de-energized without affecting other loads thereby creating increased efficiencies, lower operating and manufacturing costs and the like.

Typically, when circuit breakers are utilized, they are used to detect more than just large overcurrent conditions caused by short circuit faults. In addition, they frequently detect lower level long-time overcurrent conditions and excessive ground currents. The simplest form of circuit breakers are thermally tripped as a result of heating caused by overcurrent conditions and, in this regard, are basically mechanical in nature. These mechanical-type breakers are incorporated into almost all circuit breakers, regardless of whether or not additional advanced circuitry is provided since they are extremely reliable over a long life cycle, while providing a "default" trip-type level of protection.

These types of thermally tripped mechanical breakers are best used for detecting relatively low-level overcurrent conditions since they reflect the cumulative heating effect of low-level overcurrent conditions over a period of time. However, they do not respond well to high-current short-circuit conditions because the response time is frequently too slow to provide effective protection against such conditions. This is particularly so with modern equipment, such as computers and the like, or computer-operated equipment which are much more sensitive to overcurrent conditions.

Further, it is frequently the case that loads such as motors are now much more closely sized to their particular application in order to obtain maximum energy and cost efficiencies. Therefore, overcurrent conditions are more likely to adversely affect the load, such as the motor. This is a departure from older systems where loads such as motors were frequently oversized, since energy was cheap and oversized motors provided a level of inherent resiliency and protection to overcurrent conditions.

Other types of breakers have additional features to monitor the level of current being passed through the branch circuits and trip the breaker when the current exceeds a pre-defined maximum value. This allows a breaker to be adjusted so as to fit a particular load or condition by the end user without designing or specifying different breakers. Breakers of this type typically include a microcontroller coupled to one or more current sensors. The microcontroller continuously monitors the digitized current values using a curve which defines permissible time frames in which both low-level and high-level overcurrent conditions may exist. If an overcurrent condition is maintained for longer than its permissible time frame, the breaker is tripped.

Microcontroller controlled breakers may also include the ability to calculate RMS current values. This is necessary in order to prevent erroneously tripping a circuit breaker when a non-linear load, such as a welding machine, is coupled to the branch that it is protecting. The reason for this is that non-linear loads tend to produce harmonics in the current waveform. These harmonics tend to distort the current waveform, causing it to exhibit peak values which are augmented at the harmonic frequencies. When the microcontroller, which assumes that the current waveform is a sinusoidal current waveform, it will detects these peaks it may, therefore, trip the breaker even though the heating effect of the distorted waveform may not require that the circuit be broken.

Further, microcontrollers in some circuit breakers are used to monitor and control or account for other types of faults, such as over or under voltage conditions and phase loss or imbalances. Such microcontrollers operate solenoids which are operatively connected to the trip mechanism of the circuit breaker. Therefore, while the thermal overload portion of the breaker will operate the trip mechanism, the solenoid will operate at the instruction of the microcontroller (or sometimes also at the instruction of external signals) to allow the trip mechanism to trip the associated circuit breaker.

Further, as a result of the flexibility and breadth of protection that microcontrollers can provide when used in conjunction with circuit breakers, their use in circuit breakers is becoming more and more prevalent to the point of being standard. However, this presents another problem in that microcontrollers and the associated circuitry require power. Such power may be typically provided in one of three ways or a combination thereof and would utilize either batteries, externally-supplied power or power provided by potential transformers. However, users frequently do not like to utilize a separate power supply for each breaker or trip unit since this requires separate or additional wiring. Further, while batteries are generally reliable, they still require charging circuits, maintenance, separate compartments, additional costs and, of course, replacement. Therefore, most users provide one power supply, having battery back-up, for supplying all of the controllers for the entire substation or switchgear closet.

However, even this solution is problematic when the power supply (sometimes referred to as the control voltage) fails or begins to fail, thereby allowing what is known as an under-voltage condition to exist. Such under-voltage conditions may result from temporary overloading, power supply faults or the like. However, regardless of the reason for under-voltage conditions, during such times the microprocessor generally does not have sufficient power to operate properly. Further, electrical standards or customer design requirements dictate that the breaker must be tripped (the circuit opened) when the microcontroller does not have sufficient power to operate such as during such low voltage conditions. Additionally, low voltage conditions may not be able to provide sufficient power to the solenoid, which must be in an energized condition during normal operating conditions in order to allow the breaker to remain closed and hence energized. However, should the under-voltage condition be merely momentary, then equipment will be needlessly de-energized, resulting in downtime, increased costs and perhaps a dangerous condition (e.g. ventilation fans not providing sufficient fresh air).

Further, in order to effect such tripping, heretofore known circuit breakers typically incorporate a solenoid which when energized permits the breaker to be in the closed and energized position. When the solenoid is de-energized, the solenoid armature thereby moves and causes mechanical linkages to operate an associated mechanism on the circuit breaker such that a charged circuit breaker will open. Therefore, heretofore known circuit breakers experiencing under-voltage conditions will cause the solenoid to lose power thereby resulting in nuisance trips or a microcontroller will interrupt power to the solenoid thereby also resulting in opening of a closed/energized circuit breaker.

As previously mentioned, certain electrical standards dictate under what conditions an under-voltage trip device will act to open a charged and closed breaker with the result that typically, when the power supply control voltage drops to 30% or less, a trip coil will be de-energized and similarly, the solenoid not be allowed to reset and seal in, unless and until the rated voltage reaches at least 85% of the rated voltage, with the solenoid prohibiting the breaker from being energized until certain voltage levels are met.

Heretofore, under-voltage trip devices typically used a simple mechanical mechanism whereby the armature of a solenoid trip coil is mated with a spring in order to provide the appropriate settings for drop-out and pick-up points as well as the force required to energize a trip arm in the breaker. However, these devices, as may be guessed, are extremely difficult to set with any degree of accuracy and perhaps, more importantly, lack consistency. Additionally, different power supply voltages typically required a coil with a matching voltage reading. Further, should the trip coil be blocked from picking up for any reason at all, the trip coil may be permanently damaged. Additionally, user selection of drop-out and pick-up points or time delays was unavailable and typically had to be done at the factory under test conditions in order to ensure proper rating.

Further, each breaker type typically required a different device to provide under voltage-tripping functions, even though each breaker-type device may have had the same or similar associated problems. Moreover, such trip devices typically required a great deal of assembly and a variety of stocked parts.

Also, attempts at utilizing RC circuitry in order to hold in a trip coil during momentary dips were difficult to calibrate, bulky and expensive to utilize and required a great variety of configurations depending on the different coils for different type breakers.

Further, great variations in power supply control voltages exists amongst differing users such that trip devices must be reconfigured for each range of power supply control voltages. Such required range of voltages typically vary from 12 VDC to 200 VDC, or 10 VAC to 140 VAC. Therefore, some attempts have been made to provide a trip device power supply which utilizes at least a portion of the above recited power supply control voltages. Such power supplies have attempted to use linear-type regulators to provide the required power supply voltage (typically 5 and/or 12 VDC) although significant amounts of heat are required to be dissipated, thereby limiting the use and type of packages or simply requiring that they be placed in different parts of the breaker or the enclosure in which the breaker is housed. Some trip device power supplies have attempted to use switching regulators, although these have been found to be expensive, complex, require a significant amount of board space and further create a problem in that they require a power source to operate the switching regulators control circuit just to operate the switcher until the switcher can run on its own power, as is the case during start-up or undervoltage conditions. Complicating the fact is that the switcher power-up circuit must operate on the same voltage as the under-voltage trip device.

Therefore, trip device power supplies and power supply control voltage schemes have dictated a significant amount of trade-offs and overall have simply not provided the characteristics necessary or desired without incurring significant cost.

OBJECTS AND SUMMARY OF THE INVENTION

Accordingly, it is desirable and an object of the present invention to provide an undervoltage trip device which allows the end user to compensate for unstable power sources as well as preventing nuisance trips due to peaks and troughs from the power source.

It is also desirable and a further object of the present invention to allow the user to set the drop-out and pick-up points in order to meet specific applications.

It is also desirable and a further object of the present invention to provide an under-voltage trip device which does not require the use of a spring in conjunction with the trip coil to adjust or accomplish the settings for drop-out and pick-up points.

It is also desirable and a further object of the present invention to allow the end user to select a time delay for drop-out or to provide an adjustable time delay while still providing for adjustable drop-out and pick-up points.

It is also desirable and a further object of the present invention to provide an under-voltage trip device which does not require a second coil and latch assembly in order to provide a time delay.

It is also desirable and a further object of the present invention to provide an under-voltage trip device which does not require different devices to be provided for different voltage tripping function requirements which are specific to each category of breaker or breaker-type device.

It is also desirable and a further object of the present invention to provide for the use of one under-voltage trip device regardless of breaker type and/or with the ability to perform under different voltage tripping functions or requirements.

It is also desirable and still a further object of the present invention to provide an under-voltage trip device which eliminates the need for spring-coil adjustments and mechanical latches in order to pick-up and seal-in the device.

It is also desirable and a further object of the present invention to provide a microprocessor which will automatically control electric power distribution to the under-voltage trip device trip coil and which further allows the microprocessor to determine the drop-out and pick-up points for the trip coil at the selected voltage values and time delays.

It is also desirable and still a further object of the present invention to produce an under-voltage trip device wherein a microprocessor in conjunction with a storage device eliminates the need for mechanical or separate electrical latching mechanisms in order for the device to seal-in while also controlling the energy to the trip coil, thereby eliminating the need for resistor devices such as economizing resistors which are typically utilized to prevent the trip coil from being burned out during sealing should the trip coil be blocked.

It is also desirable and an object of the present invention to be able to allow the user to select drop-out and pick-up points in the time delay without adjustment or testing.

It is also desirable and an object of the present invention to allow such selection of drop-out, pick-up and time delay simply by utilization of dip switches in cooperation with a microprocessor.

It is also desirable and still a further object of the present invention to produce an under-voltage trip device utilizing a single trip coil which may be applied to a variety of rated control voltage sources.

It is also desirable and yet another object of the present invention to be able to compensate for a variety of power supply control voltages.

It is also desirable and still a further object of the present invention to provide a single trip device which may be utilized for a variety of control voltage sources thereby eliminating the need for the design, manufacture, testing and warehousing of a plurality of devices.

It is also desirable and a further object of the present invention to provide a single trip device which may be used with a variety of breaker types such that the electronics package, spring and trip coil solenoid are the same as one or more breaker types, with the only differences required for different breaker types being a different mechanical actuator.

It is also desirable and still a further object of the present invention to produce an under-voltage trip device which may be retrofitable to existing breaker types for a variety of different manufacturers.

It is also desirable and a further object of the present invention to provide a light indicator which may be utilized to simply check the operation device during operation or to provide a means of communicating the status of the trip device to remote monitoring stations during operation.

It is also desirable and yet another object of the present invention to provide communications of the trip device status to a plurality of network monitoring devices or schemes.

It is also desirable and still a further object of the present invention to provide an under-voltage trip device wherein the impedance of the trip coil may be monitored continuously, such that changes in trip coil solenoid impedance may be used to indicate damage or to predict failure.

It is also desirable and still a further object of the present invention to utilize a microprocessor to continuously monitor the impedance of the trip coil in order to determine the position of the solenoid actuator arm in order to detect a blocked arm.

It is also desirable and a further object of the present invention to allow the user to select, by use of a dip switch, those trip coil armature characteristics as desired.

It is still a further object of the present invention and also desirable to provide an under-voltage trip device wherein power supplied to the solenoid is controlled by a microprocessor such that current or voltage supplied to the trip coil is never greater in duration or magnitude than that desired.

It is also desirable and an object of the present invention to allow a trip coil to be overdriven, that is, applying voltages and/or current greater than the rated values of the coil to the coil, thereby ensuring maximum pull-in or pick-up strength characteristics as well as holding strength without damage to the coil, particularly over long periods of time.

It is also desirable and an object of the present invention to provide a processor controlled under-voltage trip device which pulses the trip coil continuously with higher than rated voltages and/or currents in order to maintain greater strengths over time.

It is also desirable and a further object of the present invention to provide a power supply for a trip coil which can run in a linear-type mode such as a linear-type voltage regulator, or a switcher mode such as a switching regulator.

It is also desirable and a further object of the present invention to provide a trip device power supply having a linear and a switcher mode wherein the switcher power-up circuit will operate on the same voltage as the end of voltage trip device.

It is also desirable and a further object of the present invention to provide a power supply for an undervoltage trip device which is inexpensive and relatively simple and which does not require significant board space and which minimizes the need for thermal dissipation.

It is also desirable and a further object of the present invention to provide a trip coil power supply which may be automatically controlled by a microprocessor as well as being monitored but which does not require constant microprocessor supervision, interrupts, high speed or a significant number of instructions.

It is still a further object of the present invention to provide an undervoltage trip device having communications, comprising a solenoid having a movable armature and a coil winding; at least one power supply for producing at least one output voltage and operatively connecting to the solenoid; and a microprocessor connected to the solenoid the at least one power supply so as to sample the coil of the solenoid and thereby determine the position of its armature and the power output of the power supply, said microprocessor having at least one output port for communicating the armature position of the solenoid and the power output of the power supply. Such a device is taught by the present invention.

BRIEF DESCRIPTION OF THE DRAWINGS

Reference may be now had to the accompanying drawings in which:

FIG. 2 is a diagrammatic representation of the trip coil armature mechanism according to the present invention; and FIG. 3 is a block diagram of the schematic diagram of FIGS. 1B, 1C and 1D.

DETAILED DESCRIPTION OF PREFERRED EMBODIMENT
CONSTRUCTION

Figure 1C:
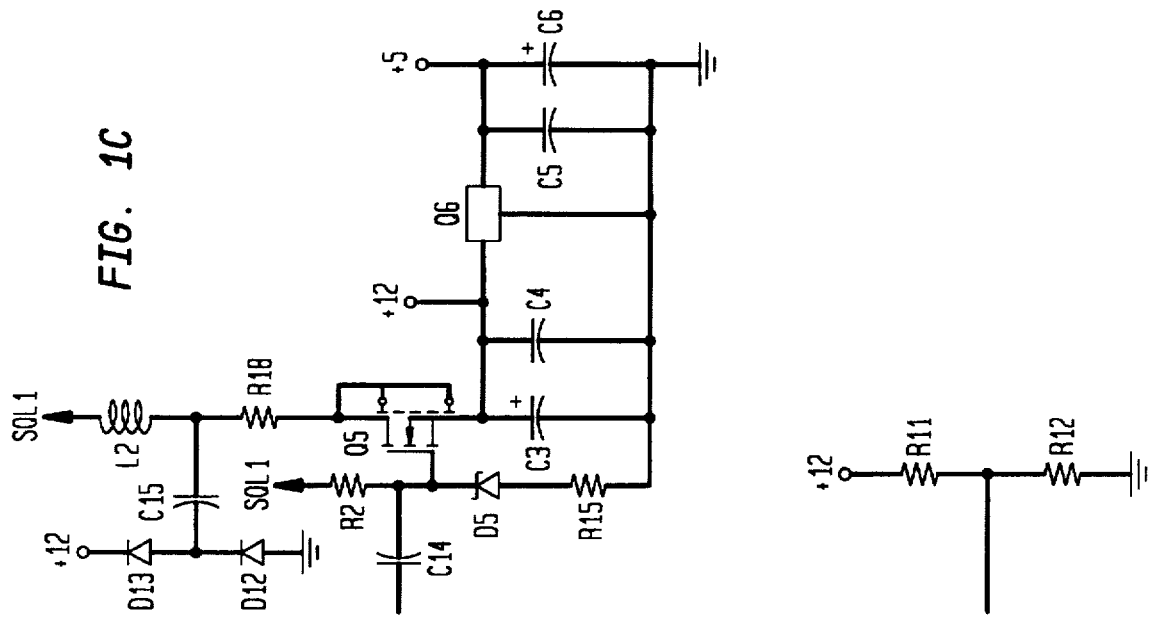
FIGS. 1B, 1C and 1D are schematic diagrams of the under-voltage trip device and power supply as taught by the present invention.
Figure 1A:
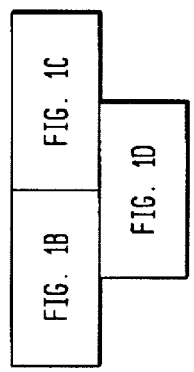
FIG. 1A which is a diagram of the interconnection of the three sheets forming FIGS. 1B, 1C and 1D.
Figure 1B:
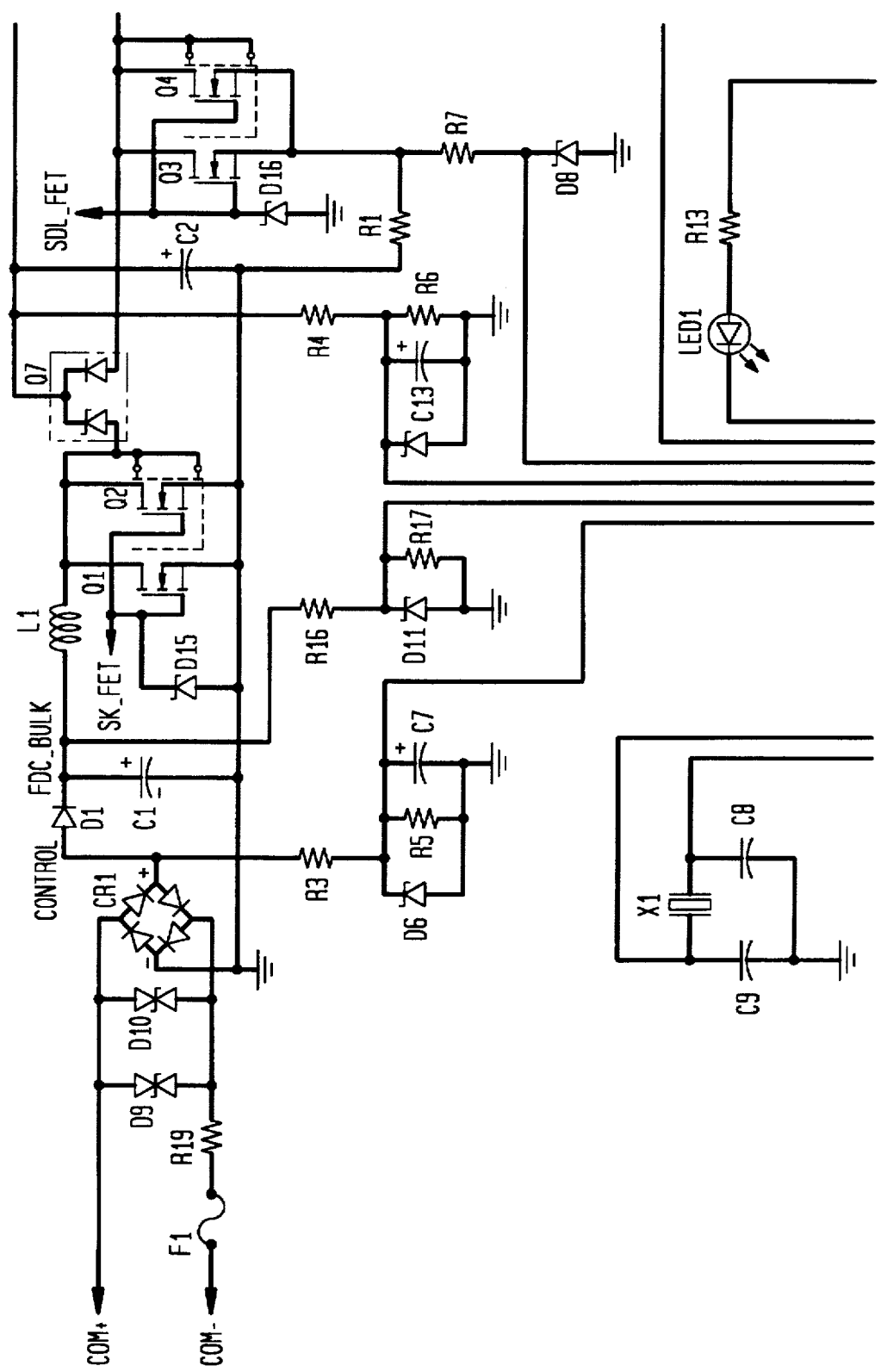
Figure 1D:
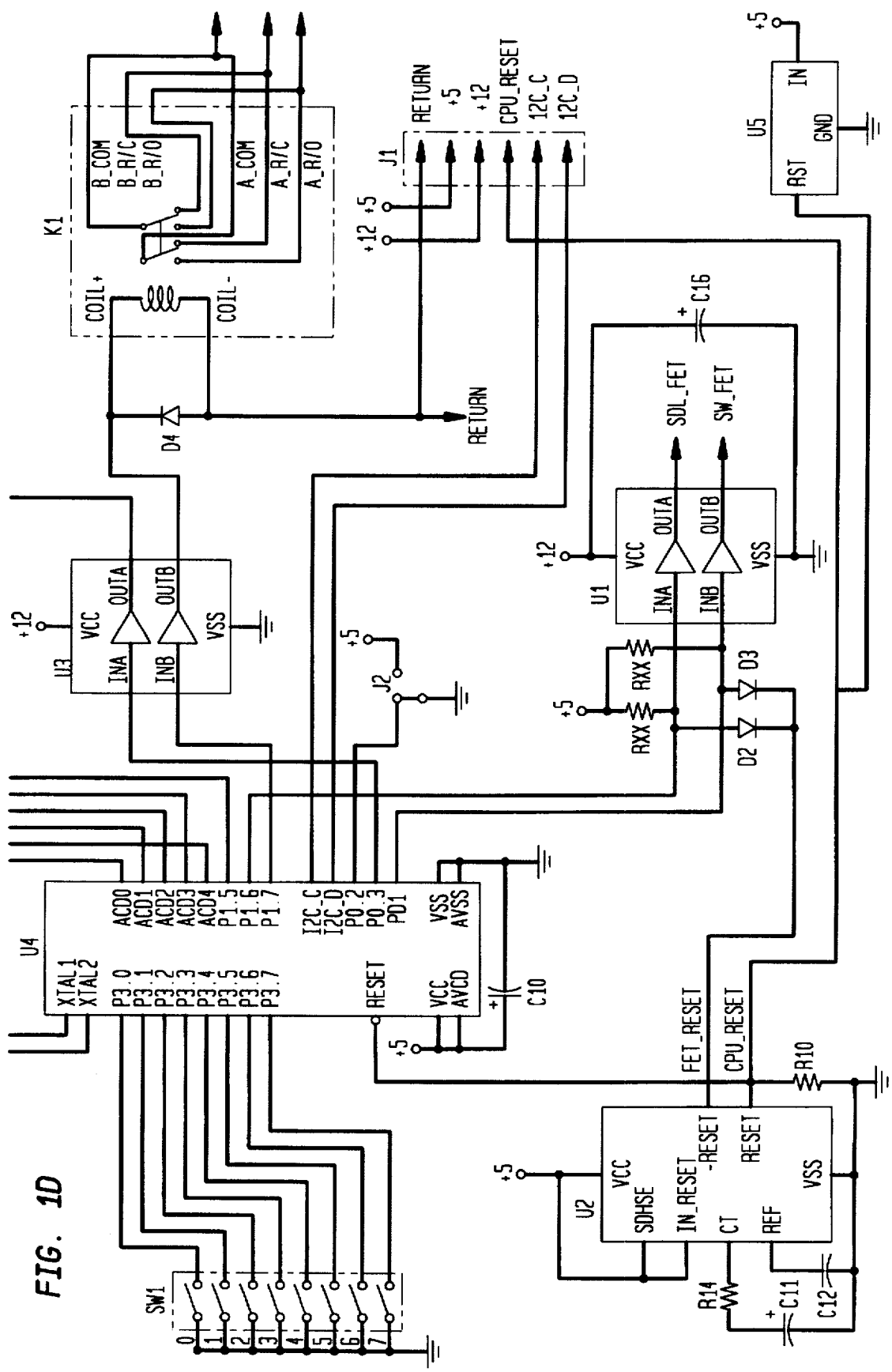

Referring now to FIG. 1A there is shown a diagram of the layout for interconnection of the sheets comprising FIGS. 1B, 1C and 1D with FIGS. 1B, 1C and 1D indicating a schematic diagram of the power supply and under-voltage trip logic for the present invention. Generally, FIG. 1B shows the main unregulated power supply for the under-voltage trip device of the present invention, FIG. 1C shows the regulated linear/switcher power supply (the regulated +12 volt portion of the +5 and +12 volt power supply) of the present invention and FIG. 1D shows the microcontroller and general logic portions of the under-voltage trip device of the present invention, all as shown in the block diagram of FIG. 3.

Accordingly, referring to FIG. 1B, 1C and 1D the plus and minus power supply control leads can be seen. In the preferred embodiment of the present invention, these leads are attached to the control voltage power supply as is typically used and is known to one skilled in the art. Therefore control leads (CONT− & CONT+) would be connected to the associated switchgear and/or substation equipment is readily known and available to one skilled in the art.

The power supply plus control lead is connected to bidirectional transient voltage supressors D9 and D10 (and one of the AC input terminals of full wave bridge rectifier CR1. The remaining AC input terminal lead of full wave bridge rectifier CR1> is connected to the remaining terminals of D9 and D10 and one leg of resistor R19 with the remaining terminal of resistor R19 next connected to one end of fuse F1. The remaining terminal fuse F1 is connected to the minus power supply with the result that full wave bridge rectifier CR1 along with diodes D9, D10 performs rectification of the power supply control input voltage while resistor R19 and fuse F1 act as current limiters.

The positive output lead of full wave bridge rectifier CR1 termed positive (+) is connected to the anode of diode D1 and one terminal of resistor R3. Cathode of diode D1 forms what is referred to as the plus DC-bulk lead and is connected to one terminal of capacitor C1, one terminal resistor R16 and one terminal of inductor L1. The remaining terminal of inductor L1 is connected to the source terminals of MOSFET transistors Q1 and Q2 as well as to the anode of one diode contained in diode pack Q7. The gates for MOSFET transistors Q1 and Q2 are connected together and form what is known as the Switcher FET lead (SW-FET lead). MOSFET transistor gates Q1 and Q2 are also connected to the cathode of zener diode D15. The anode of zener diode D15 is connected to the remaining terminal of capacitor C1 and to the drain leads of MOSFET transistors Q1 and Q2, the negative output lead of full wave bridge rectifier CR1, one terminal of capacitor C2 and one terminal of resistor R1 and thereafter connected to ground so as to form an isolated current return path or plane (entitled return).

The cathodes of both diodes contained in diode pack Q7 are tied together and thereafter to one terminal of resistor R4 and one terminal of capacitor C2, forming what is referred to as the positive solenoid lead (SOL+). The remaining terminal of the diode in diode pack Q7 which is the anode is connected to the source terminal of MOSFET transistors Q3 and Q4 and form what is known as the negative solenoid terminal (SOL−)

The gates of MOSFET transistors Q3 and Q4 are tied together (forming the solenoid FET lead, SOL-FET) as well as to the cathode of zener diode D16. The anode of diode D16 is attached to the return plane forming the isolated ground as previously mentioned. The drain terminals of MOSFET transistors Q3 and Q4 are connected to each other and to one terminal of resistors R1 and R7.

The remaining terminal of resistor R7 is connected to the cathode of zener diode D8 as well as to Analog to Digital input lead ADC2 of microprocessor U4 (sometimes commonly referred to as a microcontroller), as described more fully below. The anode of zener diode D8 is connected to the return plane. The remaining terminal of resistor R4 is connected to one terminal of resistor R6, one terminal of capacitor C13 and the cathode of zener diode D7 as well as to Analog to Digital input lead ADC1 of microprocessor U4. The anode of diode D7, one terminal of capacitor C13 and the remaining terminal of resistor R6 are all connected together and then the return plane. The remaining terminal of resistor R16 is connected to the cathode of diode D11 and one terminal of resistor R17 and thereafter to the Analog to Digital input lead ADC4 of microprocessor U4, while the anode of zener diode D11 and the remaining terminal of resistor R17 are connected together and thereafter to the return plane.

The remaining terminal of resister R3 is connected to the cathode of diode D6, one terminal of resistor R5, one terminal of capacitor C7 and thence to the Analog to Digital input lead ADC0 of microprocessor U4. The anode of zener diode D6 is connected to the remaining terminal of resistor R5 and one terminal of capacitor C7 and thereafter to the return ground plane.

In the preferred embodiment of the present invention microprocessor U4, is a standard eight bit processor readily available and known to one skilled in the art having internal programmable non-volatile and volatile memory (PROM and RAM respectively) and an input/output section (I/O), sometimes referred to as ports.

Accordingly, in the preferred embodiment of the present invention microprocessor U4 is manufactured by Phillips Semiconductor Corporation under the numerical designation 87C752-2N28. However, it is to be understood that other processors can and may be utilized without departing from the spirit and scope of the present invention, any of which may have internal or external memory or I/O without departing from the spirit and scope of the present invention. In this regard, processor U4 has effectively three I/O ports utilized and given the prefix P0, P1, and P3, as described more fully below.

Microprocessor U4 crystal lead XTAL1 is connected to one terminal of crystal X1 and to one terminal of capacitor C9, while the XTAL1 lead of microprocessor U4 is connected to the remaining terminal of crystal X1 and one terminal of capacitor C8. One terminal of capacitors C8 and C9 are thereafter connected to ground and thence to the return plane. Port 3 of microprocessor U4 designated P3.0 through P3.7 are connected respectively to terminals 0–7 of dip switch SW1. The remaining terminals of each switch 0–7 of dip switch SW1 are connected together and thereafter to the return plane.

It should be noted that ADC leads 0–4 are analog to digital converter (ADC) input lines of microprocessor U4. The ADC3 lead is connected to one terminal of resistors R11 and R12. One terminal of capacitor C14 as well as the output terminal (OUTA) of FET driver U3 are connected together. The remaining terminal of resistor R11 is connected to the +12 volt supply while the remaining terminal of resistor R12 is connected to the ground plane return. The A input terminal (INA) of FET driver U3 is connected to port terminal P0.3 of microprocessor U4, while the B input terminal (INB) of FET driver U3 is connected to port lead P1.7 of microprocessor U4. The VCC and VSS voltage supply terminals of FET driver U3 are connected to the +12 volt supply and return plane respectively, thereby providing power to FET driver U3. The port terminal P1.5 is connected to the cathode of LED1 with the anode of LED1 connected to one terminal of resistor R13 and remaining terminal of resistor R13 connected to the +5 volt power supply.

One terminal of capacitor C14 is connected to one terminal of resistor R2, the cathode of zener diode D5 and the gate of FET transistor Q5. The remaining terminal of resistor R2 is connected to the positive terminal of the solenoid (SOL+) as is the cathodes of diode pack Q7. The source terminal of MOSFET transistor Q5 is connected to one terminal of resistor R18 with the remaining terminal of resistor R18 connected to one terminal of inductor L2 and one terminal of capacitor C15. The remaining terminal of inductor L2 is connected to the SOL+ terminal of the solenoid.

One terminal of capacitor C15 is connected to the cathode and anode of diodes D12 and D13 respectively, with the remaining terminals of diodes D12 and D13, respectively are connected to the return plane and the +12 volt power supply. The anode of zener diode D5 is connected to one terminal of resistor R15 with the remaining terminal of resistor R15 connected to one terminal each of capacitors C3, C4, C5 and C6, as well as the negative input lead of voltage regulator Q6 which in the preferred embodiment of the present invention is a 5 volt voltage regulator such as those readily known and available to one skilled in the art. One terminal of capacitor C3 and C4 is connected to the drain terminal of MOSFET transistor Q5 as well as to the +12 volt power supply and the input lead of voltage regulator Q6. The output lead of voltage regulator Q6 is connected to one terminal of capacitors C5 and C6 and thereby form the +5 volt power supply lead. One terminal each of capacitors C3, C4, C5 and C6, as well as the common terminal lead of voltage regulator Q6, are connected to the mentioned ground return plane.

The B output terminal (OUTB) of MOSFET driver U3 is connected to the cathode of diode D4 and to the one terminal of relay K1. In the preferred embodiment of the present invention, relay K1 is what is referred to as a form-C type relay as is readily known and available to one skilled in the art. The remaining terminal of the coil of relay K1 is connected to the anode of D4 and to the return ground plane, as well as to the return terminal on terminal jack J1. Since, as mentioned, relay K1 is a form-C type relay, it is a double throw, double pole relay. Therefore, the two common leads are connected to each other and form the common relay lead (RELAY-COM). Similarly, the normally closed terminals (A-N/C and B-N/C) are connected together and form the normally closed relay contact lead (RELAY-N/C). Further, the normally open terminals (A-N/O and B-N/O) are connected together and form the normally open relay lead (RELAY-N/O).

The I²C terminal which is labeled the I2C-Clock terminal of microprocessor U4 is available at terminal J1 and provides synchronizing pulses while I2C-Data forms a data terminal lead and together with I2C-Clock provides communications/interrogation capability of the undervoltage trip device as described more fully below.

Port terminal PO.2 is connected to one arm of switch J2 which is thereafter in its normal state is connected to the return to ground plane, while the remaining terminal of switch J2, a single-pulse double throw, switch, is connected to the +5 voltage supply. The pulse width modulation terminal (PWM) of the microprocessor is in actuality a port output terminal is connected to the B input terminal (INB) of FET driver U1 and to the anode of diode D3 and to one terminal of resistor R9. Similarly, port terminal P1.6 is connected to A input terminal (INA) of FET driver U1 as well as to anode of diode D2 and one terminal of resistor R8. The remaining terminals of resistors R8 and R9 are connected to each other and thence to the +5 voltage supply. Output A terminal (OUTA) of FET driver U1 is connected to the solenoid FET lead (SOL-FET) while the B output terminal (OUTB) of FET driver U1 forms the switcher FET terminal (SW-FET) also as described more fully below.

The VSS and VCC terminals of FET driver U1 are connected to one terminal each respectively of capacitor C16 and thence to the return ground plane and the +12 volt power supply respectively, thereby powering FET driver U1. The VCC and AVCC power supply terminals of microprocessor U4 are connected to the +5 power supply as well as to one terminal of capacitor C10, while the VSS and AVSS terminals of microprocessor U4 are connected to each other and thence to one terminal of capacitor C10 and the return ground plane. The reset terminal of microprocessor U4 forms the CPU-RESET lead and is connected to the positive reset lead of reset module U2 and also appears as a terminal on CPU-RESET terminal on jack J1.

The cathodes of diode D2 and D3 form the FET reset lead (FET-RESET) and are connected to the negative reset terminal of reset module U2. The sense and input reset (IN-RESET) lead of reset module U2 are connected to each other as well as to the VCC terminal of reset module U2 and thence to the +5 volt power supply. The count lead (CT) of reset module U2 is connected to resistor R1. The remaining terminal of resistor R14 and to one terminal of capacitor C17. The remaining terminal of capacitor C17 is connected to one terminal of capacitor C12, the VSS terminal of reset module U2, one terminal of resistor R10 and thence to the ground plane. The remaining terminal of capacitor C12 is fed to the reference lead of reset module U2 (REF).

Finally, the negative reset lead forming the reset FET lead (FET-RESET) which is connected to the negative reset lead of reset module U2 and to the cathodes of diodes D2 and D3 is also connected to the NOT reset (RST) lead of driver U5. The ground lead of driver U5 is connected to the return plane, while the input (IN) lead is connected to +5 volts power supply.

OPERATION

Referring now to FIGS. 1B, 1C, 1D, 2 and 3 overall operation of undervoltage trip device according to the preferred embodiment of the present invention will be discussed. Accordingly, power is provided to the plus and minus control leads which is produced by the control system power supply as previously discussed (not shown). As is readily known in medium and low voltage switch gear applications, a separate power supply system is maintained specifically for power control equipment, that is, devices which control or measure the flow of current through a particular switchgear and trip unit apparatus. Therefore, this power is typically extremely well regulated and reliable. However, loss of such control power typically deprives the user and the switchgear or trip units of certain measurement and control features with the result that, by design and by default, the breakers will trip out, thereby interrupting the current flow therethrough, even though no fault condition may technically exist. This control voltage is therefore frequently supplied from batteries which derive their power from potential transformers, power supply transformers and the like (not shown).

In the preferred embodiment of the present invention, this control voltage may be AC or DC and may vary from 12 volts DC through 200 volts DC and 12 volts AC through 140 volts AC, although higher or lower AC and DC voltages can and may be utilized without departing from the spirit and scope of the present invention. However, regardless of the voltage supplied, the present power supply (shown generally in FIG. 1B and also in FIG. 3) is comprised of a full wave bridge rectifier circuit which produces a control voltage output which is at the same level, regardless of whether the rest of the control voltage is AC or DC or its level thereof for use by the balance of the circuitry in the present invention.

This control voltage flows through diode D1 and charges capacitor C1, thereby forming the positive DC BULK voltage which is constant. Additionally, the control voltage flows through resistor R3 and is utilized to charge capacitor C7 with the results that capacitor C7 when fully charged is proportional to the control voltage. This control voltage is presented to an A to D input terminal on the microprocessor so as to be capable of measurement and to provide for subsequent adjustment in transmission or communication as described more fully below. This DC BULK power supply voltage passes through inductor L1 and, hence, MOSFET transistors Q1 and Q2 when their gate voltage is at the required level. This gate voltage, referred to in the Figures as the Switcher FET (SW-FET) lead is supplied by the pulse with modulator terminal (PWM) of microprocessor U4 and although labeled as such is in actuality an output port of microprocessor U4. This PWM terminal is used to produce a pulsed output such that pulsing of same causes Q1 and Q2 to cause inductor L1 to oscillate, therefore forming a pulsed voltage via one of the diodes in diode pack Q7 with the result that C2 is charged.

Capacitor C2 is utilized to ensure a proper voltage supply and in the preferred embodiment of the present invention is a 200 volt 1200 microfarad capacitor. Therefore, should the control voltage drop below acceptable levels or the power supply or a portion of the present invention fail, capacitor C2 will stay charged to a sufficient level (preferably 120 volts) thereby providing enough energy to keep the solenoid lead (SOL+) at the proper level and, hence, the solenoid (FIGS. 2 and 3) energized for the desired time, as long as control power is not lost. In the preferred embodiment of the present invention this time is selectable up to a period of three seconds as described more fully below.

MOSFET transistors Q3 and Q4 are energized by the solenoid FET lea (SOL-FET) d which is derived from port P1.6 of microprocessor U4 and are utilized to energize and de-energize the solenoid as required. In terms of overall measurement and control, it can be seen that the control and DC BULK voltages are measured as a function of the voltage across capacitor C7 and zener diode D11 respectively which are presented to A-D converter terminals 0 and 4 of processor U4, respectively.

Similarly, the positive solenoid voltage is measured as a voltage drop through resistor R4 which is thereafter presented to A-D terminal 1 (ADC1) of processor U4. Further, microcontroller A-D port 2 (ADC2) is used to measure the voltage drop across resistor R1 which in the preferred embodiment of the present invention is a 0.3 ohm resistor. In the preferred embodiment of the present invention, this voltage is measured approximately every 2.5 seconds and is the result of the current rushing into the solenoid's coil as a result of R1 which is electrically located between the solenoid and the ground. In this fashion, the position of the solenoid armature is known as a function of the current therethrough and the voltage across R1.

Relay K1 is controlled by the microprocessor terminal labeled P1.7 and is the result of a port in the microprocessor U4. The contacts of this form C relay are utilized, as is readily known to one skilled in the art, to provide status conditions, external indicators and the like. Additionally, an LED which is connected to port P1.5 of the microprocessor U4 is utilized to provide status conditions of the solenoid and the power supply as described more fully below.

As can be seen, the regulated power supply which is designed to provide a minimum of 120 volts DC, also thereafter supplies power to the regulator/switcher power supply. In the preferred embodiment of the present invention it has been determined that 120 volt DC minimum voltage is appropriate in that, when utilized with capacitor C2 provides sufficient power to maintain the solenoid in the closed position for a period of three seconds after loss of control power. However, it is to be understood that other voltages can and may be utilized without departing from the spirit and scope of the present invention with resultant changes in power dissipation, current and the like occurring.

The regulator switcher (the regulated +12 volt portion of the +5 and +12 power supply) in the preferred embodiment of the present invention is a power supply with the +12 volt power supply operating as a linear-type voltage regulator which thereafter operates as a switcher-type regulator which is controlled by the processor. Accordingly, when this regulator supply is first energized, the circuits supplied thereby are powered in the linear mode until such time as the processor becomes energized after reset and thereafter takes over power supply operation.

Accordingly, in the preferred embodiment of the present invention during linear operation, the voltage of the +12 line is approximately 8.5 volts, which is set by the voltage value of D5. Thereafter, once the processor becomes fully operational using A-D terminal 3 (ACD3) of microprocessor U4, the +12 voltage supply which is the voltage between resistors R11 and R12, is monitored. In the event that the voltage is low, short pulses are sent by port PO.3 of microprocessor via driver U3 which pass through capacitor C14 and which thereafter turn on transistor Q5. This thereafter allows inductor L2 to charge, with the result that at the end of the pulse, L2 will begin to oscillate. A portion of this energy is removed from each oscillation through capacitor C15 and is directed to the +12 line by diodes D12 and D13.

Additionally, capacitor C15 blocks high voltage DC from the lower voltage DC while passing alternating current which is thereafter rectified by diodes D12 and D13. In this fashion, C15 functions like a transformer, thereby saving significant space and expense. Further, because the control power supply voltage does not generally vary greatly, constant supervision is not required by the processor with the result that it is generally only required to correct voltage of the switcher occasionally and therefore does not require significant CPU cycles.

When in the switcher mode of operation, the present circuit design reduces the thermal dissipation required because the VA entering L2 is in the form of high voltage and low current. This VA is changed into flux as L2 charges and, therefore, once the pulse from microprocessor U4 ends, current which flowed through L2 stops and the flux will necessarily begin to collapse. Capacitor C14 and diodes D12 and D13 convert and direct the VA into low voltage and high current. Capacitor C15 and diodes D12 and D13 extract power from the inductor which is not referenced to the voltage supplied to the inductor with the result that Q5 may be referenced to a return thereby also saving in cost.

User selectability of various functions is provided by dip switch S1 which is connected to ports P3.0 through P3.7 thereby providing for eight switch inputs. These switch inputs are utilized to select and determine the appropriate drop-out and pick-up points in respect of the control voltage values as well as the delay time intervals as recited more specifically below.

Reset control U2 is utilized such that the solenoid and switcher FET leads are kept inactive until the processor can control same by only allowing the processor to be released if the voltage is at a predetermined value for a predetermined period of time and, therefore, if the voltages of the processor drop below said value, the processor is inhibited from controlling the switcher.

As is well known to one skilled in the art, the armature of the solenoid is operatively connected to a trip arm such as that diagrammatically shown in FIG. 2. This trip arm is utilized to either cause the breaker to be de-energized or to prevent its energization in the event that the control voltage from the system is below a certain predetermined value as specified below, or is simply absent.

Accordingly, by way of providing a general overview, the incoming control power first passes through an unregulated power supply which rectifies the control voltage and ensures that the correct polarity is applied. This power is then stored in a capacitor C1 which acts as a reservoir of power for L1/Q1,2 switcher/regulator. A capacitor is connected to an inductor and together they form an LC network that can be forced to oscillate by the microprocessor. These oscillations generate large voltage and current pulses that are directed by a diode to charge a second, more substantial capacitor. The second capacitor C2 is charged to the preferred known VDC of 120. The microprocessor, through its pulses, acts like a pulse width modulator which controls the LC oscillations in order to maintain this DC voltage of the second capacitor. This second capacitor is used with a regulated power source which is used to power the solenoid and which keeps the solenoid powered during short-time losses of control power. This is also the same power source that supplies the current pulses for inductance testing on the solenoid and provides power to the +12 volt regulator. In the preferred embodiment of the present invention, the pulse width modulation is operated in a frequency range from approximately 7 Khz to about 20 Khz with variations in the duty cycle of approximately 10% to 90%.

During startup the +5 and +12 volt regulated power supply begins to run in a linear mode. Thereafter, when the processor U4 becomes operational, reset module U2 allows the CPU U4 to run the regulated power supply in the switcher mode. During operation, the processor U4 determines the inductance of the solenoid windings and thereby determines its position by comparing a measured value with a predetermined value disposed in the microprocessor as a result of the R1 voltage.

In the preferred embodiment of the present invention, the voltage applied to the solenoid is approximately twice the solenoids rated voltage. This is possible without burning out the solenoid because the amount of time the power is applied is monitored by the microcontroller in order to prevent damage to the solenoid. This higher voltage is applied for approximately 17 milliseconds in order to provide extremely high hold-in forces to the solenoid and to thereby provide additional delay during under-voltage conditions since it takes a longer period of time for this high voltage to dissipate in the coil before the magnetic forces become insufficient to hold the armature in the proper position. Additionally, this duration/duty cycle or voltage value may even be increased once experience is gained with the particular solenoid or to increase the pull-in or retract force of the solenoid as necessary.

Further, in order to find the inductance value that relates to the position of the shaft of the solenoid, the solenoid is powered by a pulsed DC voltage (SOL+) which is approximately two times the solenoid operating voltage. This voltage is applied for approximately seven milliseconds with the current rushing into the solenoid's coil being measured by the voltage dropped across resistor R1. This measurement of the voltage is done approximately four times during this seven millisecond time frame. In the preferred embodiment of the present invention, these four measurements are averaged in order to be compared against the stored value. In this fashion, the solenoid position and hence the state of the solenoid itself may be determined.

As a result of being able to determine the solenoid position as a function of solenoid impedance, it is now possible to predict solenoid coil failure in the same fashion as determining the solenoid's shaft position. This failure prediction is measured and analyzed as a decrease in the solenoid coil's inductance below predetermined values over a predetermined period of time. Such decreases may typically occur if the solenoid and coil windings begin shorting together as a result of, for example, insulation deterioration, heat, age and vibration.

In the preferred embodiment of the present invention, this failure detection starts once the solenoid is in the closed position and approximately once every 2.5 seconds, the inductance is checked in the same way the solenoid shaft position is detected. The resultant value of each test is then compared to the inductance value stored in the processor. If the value is outside of a predefined window, then an alarm may be activated or the device may be de-energized, as determined by the user. However, in the preferred embodiment of the present invention, only an alarm would be indicated since the objective of failure prediction is to detect the failure in a solenoid before a catastrophic failure occurs, thereby allowing a user to replace the solenoid during a controlled shut-down, rather than from an unannounced trip due to coil failure.

With respect to the LED alarm LED1, in the preferred embodiment of the present invention, this LED visibly displays the alarm condition as follows:

(1) NORMAL: Under normal operating conditions the LED will indicate the undervoltage trip device of the present invention is functional by flashing.

(2) PROBLEM: The LED will indicate that a problem exists by turning on and remaining on until the situation is rectified. Further, this LED will remain on for one or more of the following situations:

(a) If the applied rated voltage of the control power supply is significantly higher than the expected rated voltage, due to, for example the dip position switch settings, the LED will illuminate continuously, remain on. The actual over voltage levels will be:

| Rated Voltage | Over Voltage Indication |
| --- | --- |
| 24 VDC | 29 VDC |
| 48 VDC | 56 VDC |
| 125 VDC | 140 VDC |
| 120 VAC | 127 VAC |

(b) When the voltage drops below the pick up point, the LED will turn on to indicate a pending trip. The LED will not return to its flashing state until the voltage has exceeded a value slightly higher than the pick up point and will remain on until the voltage exceeds this pick up point.

(c) If the coil is blocked from picking up, the LED will remain on until the coil picks up and seals in or the control power is removed from the unit.

(d) If the trip coil failure prediction routine detects a significant change in the trip coil impedance, indicating deterioration of the trip coil impedance, the LED will remain on until the situation is rectified.

(3) PROBLEM: The LED will remain off when one or more of the following conditions exists:

(a) The rated voltage supplied to the undervoltage trip device has been terminated for greater than 10 seconds.

(b) The electronics has experienced a catastrophic failure, i.e., an internal high current short.

Further, in the preferred embodiment of the present invention, the Under Voltage Trip Device, UVTD, will preferably operate to open a breaker between 30 and 60 percent of the UVTD rated operating power supply control voltage and will not operate to open the breaker at values above 60% of the rated power supply voltage but shall pick up and seal in between 30 and 85% of the rated power supply voltage thereby allowing the associated breaker to close. However, it is to be understood that these percentages may be changed simply by changing the dip switch SW1 settings.

Therefore, when the solenoid is picked up it will charge a spring on the mechanical linkage (as shown diagrammatically in FIG. 2) and retain a charge until the solenoid drops out. As such, while picked-up the solenoid will prevent the mechanical linkage from interfering with the normal operation of the breaker.

The DIP switches (SW1) are used to determine the appropriate drop out and pick up points, delays and the like as follows.

The drop out and pick up points will differ depending on the selected control voltage value. By example, the following four drop-out and four pick up points will be available for each indicated voltage selection:

(1) For 48 VDC, 125 VDC, and 120 VAC, there are no time delay limitations or energization delays.

The drop out and pick up point selections are:
(a) Drop out point selections are:
  (i) 40%
  (ii) 45%
  (iii) 50%
  (iv) 56%
(b) Pick up point selections are:
  (i) 80%
  (ii) 73%
  (iii) 67%
  (iv) 60%

(2.) For 24 VDC:
(a) Drop out points and Maximum time delays achievable at the rated voltage setting are:
  (i) 12 VDC, Maximum time delay instantaneous
  (ii) 14 VDC, Maximum time delay—one second
  (iii) 16 VDC, Maximum time delay—two seconds
  (iv) 18 VDC, Maximum time delay—three seconds
(b) Pick up point selections are:
  (i) 19 VDC
  (ii) 20 VDC
  (iii) 21 VDC
  (iv) 22 VDC With respect to timing the solenoid drop out delay, the time interval is selected using two DIP switches. These user selectable time intervals are:

a) instantaneous, 0.2 seconds or less
b) one second delay
c) two second delay
d) three second delay Finally, a Test/Communications Port is provided, as mentioned, at the J1 jack and is comprised of the I2C-Clock and I2C-Data terminals of microprocessor U4. Moreover, in the preferred embodiment of the present invention, this port may accommodate a card to allow for electronic communications with other microprocessor based equipment. The port, although capable of being directed to provide numerous values and conditions, will also allow monitoring via a computer for factory testing, and in its preferred embodiment, produces a number of output signals, such signals being representative of all vital voltages and values and the like from the processor and being:

1. the value of the power supply control voltage representative of calculated voltage from capacitor C7;
2. the capacitor voltage of capacitor C2 and hence the plus solenoid voltage;
3. the +12 volt DC measured voltage;
4. the DIP switch positions as a value representative by port P3.0 through P3.7;
5. a problem log which in the preferred embodiment of the present invention is an eight bit word;
6. the solenoid currents;
7. the + BULK voltage values; and
8. the seconds, minutes and hours as 3 different transmissions, representing how long the solenoid has been in the closed position since its last reset.

Accordingly, many variations of the present invention can be practiced without departing from the spirit and scope of the present invention. For example, the electronics may be integral with or mounted separate from the electromechanical tripping mechanism or the breaker. Further, different processors or processor arrangements having internal or external ports, memory and the like may be utilized. Further, DIP switch selection values may increase or decrease or may be changeable simply by software changes preprogrammed into the processor associated circuitry. Also, different voltage or current ranges may be taken into account while different PWM ranges for the solenoid may be used. Additionally, fewer or greater numbers of data communication values may be utilized while the manner in which the communication is accomplished may be changed, for example, parallel ports depending upon the processor chosen.

What is claimed is:

1. An undervoltage trip device system, for use with a circuit breaker comprising:

A) a dual mode power supply comprising:
  1) unidirectional voltage clamp means for producing a first voltage thereacross which is related to an input voltage during a first operational mode of said dual mode power supply;
  2) oscillator means connected said unidirectional voltage clamp means and to a first impedance means, said oscillator means charging said first impedance means;
  3) second impedance means connected to said first impedance means for passing at least a portion of said charge at a voltage greater than said input voltage during a second mode of said dual mode power supply; and
  4) energization means connected to said oscillator means for energizing said oscillator means when said input voltage is less than a predetermined level;

17

B) status checking means for checking a condition of a solenoid during operation of said solenoid, comprising:
  1) impedance measurement means selectively coupled to a solenoid coil for measuring a signal related to an impedance of the solenoid coil and producing an output signal thereat; and
  2) a microprocessor connected to said impedance measurement means to receive said output signal and for comparing said output signal to at least a stored value, said stored value indicative of the condition of the solenoid;
C) solenoid energization means, comprising:
  1) a second power supply controllable by a pulse means for supplying voltage to said solenoid coil; and
  2) said pulse means connected to said second power supply and controlling said second power supply such that i) repetitive pulses of voltage from said second power supply are supplied to the coil and ii) an instantaneous value of said repetitive pulses of voltage supplied to the solenoid coil is greater than a rated steady state voltage level of said solenoid coil;
D) means for communicating selected criteria and conditions relating to at least one portion of the undervoltage trip device system, wherein:
  1) said microprocessor is connected to said solenoid and at least one of said power supplies so as to measure an inductance of the coil of said solenoid and thereby determine i) an armature position of said solenoid, ii) a condition of said solenoid, and iii) the power output of said power supply, and
  2) said microprocessor has at least one output port for communicating a) said armature position of said solenoid, b) said condition of said solenoid and, c) said power output of said power supplies;
E) a third power supply for accepting a range of AC or DC input voltages and producing a uniform output voltage in response to control signals, comprising:
  1) diode bridge means having an input for receiving the range of AC or DC input voltages thereat, said diode bridge means producing a first output voltage having a first DC level upon proper polarized connection of an input voltage to said input of diode bridge means, and for producing said first output voltage of a known polarity;
  2) third impedance means connected to said first output voltage for storage of electrical energy;
  3) resonant circuit means connected to said third impedance means and producing a second output voltage in response to an oscillation signal, said second output voltage i) derived from and related to said electrical energy stored in said third impedance means and ii) having a DC level greater than said first DC level;
  4) oscillation signal means connected to said resonant circuit means;
  5) fourth impedance means; and
  6) a unidirectional voltage means connected to pass said second output voltage from said resonant circuit means to said fourth impedance means, said fourth impedance means storing said second output voltage whereby said oscillation signal means controls oscillation of said resonant circuit such that said second output voltage remains at a predetermined level as long as the input voltage level remains within a predetermined range, and
F) input means for electrically configuring and controlling at least one portion of the undervoltage trip device system, wherein:

18

1) the solenoid is electronically controllable by said microprocessor; and
  2) said microprocessor includes
    a) output means to control said solenoid and said second power supply and
    b) input means for electrically configuring said microprocessor in order to configure and control at least one of
      i) pick up points and
      ii) drop out points of said solenoid and to indicate the input voltage of said third power supply.

2. A system according to claim 1, wherein said means for communicating includes remote monitoring means for remotely monitoring a condition of said undervoltage trip device system.

3. A device according to claim 2, wherein said remote monitoring means monitors at least one of
  i) a voltage present in said undervoltage trip device system,
  ii) an output voltage of said undervoltage trip device system, and
  iii) an output current of said undervoltage trip device system.

4. A system according to claim 1, further comprising: display means for displaying a condition of said undervoltage trip device system.

5. A system according to claim 4, wherein said display means displays at least one of:
  i) an overvoltage condition present in said undervoltage trip device system,
  ii) an undervoltage condition present in said undervoltage trip device system,
  iii) an overcurrent condition present in said undervoltage trip device system,
  iv) an undercurrent condition present in said undervoltage trip device system, and
  v) loss of input voltage to said undervoltage trip device system.

6. A device to determine a condition of a coil comprising:
A) a dual mode power supply comprising:
  1) a unidirectional voltage clamp connected to an input voltage to produce a first voltage which is related to the input voltage during a first operational mode of the dual mode power supply;
  2) a first oscillator connected the unidirectional voltage clamp and to a first energy storage device, the oscillator charging the first energy storage device;
  3) a second energy storage device connected to the first energy storage device to pass at least a portion of the charge at a voltage greater than the input voltage during a second mode of the dual mode power supply; and
  4) an energizer connected to the oscillator to energize the oscillator when the input voltage is less than a predetermined level;
B) a status checker to check a condition of the coil during operation of the coil, comprising a microprocessor selectively coupled to the coil to measure a signal related to an impedance of the coil and to compare the signal to at least a stored value, the stored value indicative of the condition of the coil;
C) a coil energizer, comprising:
  1) a second power supply controllable by a pulse generator to supply voltage to the coil; and
  2) the pulse generator connected to the second power supply to control the second power supply such that i) repetitive pulses of voltage from the second power supply are supplied to the coil and ii) an instantaneous value of the repetitive pulses of voltage supplied to the coil is greater than a rated steady state voltage level of the coil;

D) a communications port to communicate selected criteria and conditions relating to the coil, wherein:
1) the microprocessor is connected to the coil and at least one of the power supplies so as to measure an inductance of the coil and determine at least one of i) an armature position of the coil, ii) a condition of the coil, and iii) the power output of the power supply, and
2) the microprocessor has at least one output port to communicate at least one of a) the armature position of the coil, b) the condition of the coil and, c) the power output of the power supplies;

E) a third power supply which accepts a range of AC or DC input voltages and producing a uniform output voltage in response to control signals, comprising:
1) a diode bridge having an input to receive the range of AC or DC input voltages, the diode bridge producing a first output voltage having a first DC level upon proper polarized connection of an input voltage to the input of diode bridge, and to produce the first output voltage of a known polarity;
2) a third energy storage device connected to the first output voltage for storage of electrical energy;
3) a resonant circuit connected to the third energy storage device and producing a second output voltage in response to an oscillation signal, the second output voltage i) derived from and related to the electrical energy stored in the third energy storage device and ii) having a DC level greater than the first DC level;
4) a oscillator connected to the resonant circuit;
5) a fourth energy storage device; and
6) a unidirectional coupler connected to pass the second output voltage from the resonant circuit to the fourth energy storage device, the fourth energy storage device storing the second output voltage whereby the oscillator controls oscillation of the resonant circuit such that the second output voltage remains at a predetermined level as long as the input voltage level remains within a predetermined range, and F) a switch to electrically configure and control at least one portion of the device, wherein:
1) the coil is electronically controllable by the microprocessor; and
2) the microprocessor includes
   a) an output to control the coil and the second power supply and
   b) an input to electrically configure the microprocessor in order to configure and control at least one of
      i) pick up points and
      ii) drop out points of the coil and to indicate the input voltage of the third power supply.

7. A device according to claim 6, wherein the coil is part of a solenoid.

8. A device according to claim 6, wherein the processor predicts a coil failure by determining a change the inductance of the coil over a predetermined time interval.

9. A device according to claim 6 wherein the armature of the coil is a moveable armature and the microprocessor further determines the position of the moveable armature relative to the coil.

* * * * *